United States Patent
Kohlert

[19]
[11] Patent Number: 5,915,679
[45] Date of Patent: Jun. 29, 1999

[54] SUPPORT ELEMENT FOR SECURING A WORK PIECE ON A SUPPORTING SURFACE

[76] Inventor: Rudolf Kohlert, Danziger Str. 3, 63811 Stockstadt, Germany

[21] Appl. No.: 08/841,754

[22] Filed: Apr. 30, 1997

[30] Foreign Application Priority Data

May 5, 1996 [DE] Germany .......................... 196 17 927

[51] Int. Cl.⁶ ...................................................... B23Q 3/00
[52] U.S. Cl. ................................ 269/309; 91/422; 91/443
[58] Field of Search ...................... 91/422, 443; 269/309, 269/310, 20, 296; 188/67, 129

[56] References Cited

U.S. PATENT DOCUMENTS

| 3,394,542 | 7/1968 | Cowans | 91/422 |
| 3,439,584 | 4/1969 | Kaptur | 91/443 |
| 3,938,798 | 2/1976 | Solie et al. | |
| 4,434,704 | 3/1984 | Surjaatmadja | 91/422 |
| 4,794,843 | 1/1989 | Poling | 91/443 |

FOREIGN PATENT DOCUMENTS

| 2257008 | 5/1974 | Germany . |
| 283095 | 10/1990 | Germany . |
| 283100 | 10/1990 | Germany . |

*Primary Examiner*—Robert C. Watson
*Attorney, Agent, or Firm*—W. F. Fasse; W. G. Fasse

[57] ABSTRACT

A support element for supporting or holding a work piece on a mounting surface, for example in a machine tool, has a support or pin movably mounted in a housing. The pin is moved into contact with a work piece by an airstream, held in work piece contact by a hydraulic piston, and reset into a starting position by at least one spring, whereby the work piece is contacted gently under a manual throttle control of the airstream, but firmly held in place by hydraulic pressure.

12 Claims, 1 Drawing Sheet

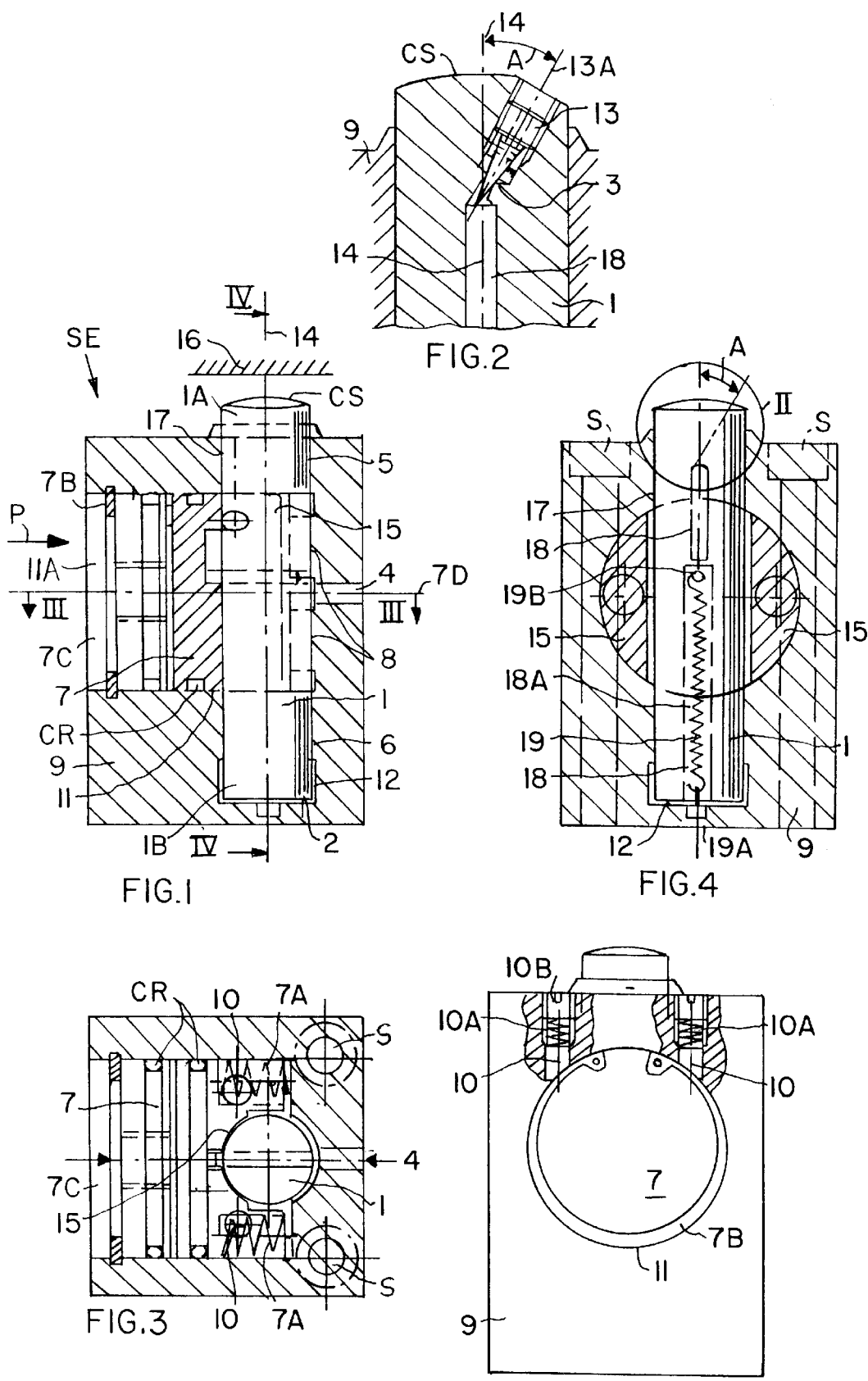

SUPPORT ELEMENT FOR SECURING A WORK PIECE ON A SUPPORTING SURFACE

FIELD OF THE INVENTION

The invention relates to a support element for securing a work piece on a supporting surface, for example in a machine tool, on a machine table or platen, on a palette, or a work piece holding jig. The work piece is held by a pin which is moved pneumatically into contact with the work piece and clamped in place hydraulically for supporting labile work pieces to be clamped.

BACKGROUND INFORMATION

Supporting elements of this type are used primarily for clamping a work piece in machine tools. Labile work pieces require for their clamping generally more than three support points. Support elements suitable for providing the support points are movable and must gently contact the labile work piece to avoid displacing the work piece out of a located position. The term "located position" in this context means that the work piece has been located in a precise position relative to a three dimensional coordinate system in preparation for a machining operation, for example. Labile work pieces are sensitive in this respect because due to their lability, they have a tendency to again move out of a located position. The gentle movement of a support into contact with a located work piece can be accomplished in a practical way only with an adjustable force. On the other hand, it is necessary that the work piece is held in the located position by the pin during the entire machining operation.

Support elements are known in which the pin is adjusted into a work piece contacting position by screws, wedges, springs, or a hydraulic drive. The clamping of the properly positioned pin then takes place through a piston cylinder device or through expandable tapes. Generally, these procedures of contacting and clamping take place automatically.

However, especially in connection with labile work pieces a consistently repeatable sensitive adjustment of the contacting force is required to avoid moving the once located work piece out of its located position. This condition is not satisfied by known support elements. Further, it is necessary that each support element is individually adjustable and readjustable at any time.

OBJECTS OF THE INVENTION

In view of the above it is the aim of the invention to achieve the following objects singly or in combination:

to construct a support element of the type described above in such a manner that its initial contact force is manually adjustable with due regard to the requirements for different work pieces;

to make sure that a sensitive fine adjustment can be performed for contacting the work piece prior to any subsequent application of a clamping force or a force that will hold the pin in its fine adjusted position;

to make sure that the work piece contacting operation and the subsequent locking of the pin in an adjusted position can be repeated any time with the required precision if necessary even during the machining operation;

to make sure that the manual adjustment will not interfere with the contacting of the work piece by the pin; and to automatically return the pin into its starting position when the support element is removed or released.

SUMMARY OF THE INVENTION

A support element according to the invention is characterized by the following features. A housing of the support element has a housing bore in which a support bolt referred to as pin is supported for axial movement. The pin has an outer end projecting from the housing and an inner end inside the housing bore. The pin has an outer diameter slightly smaller than an inner diameter of the housing bore to permit an air flow around the pin, thereby supporting the pin in the manner of an air cushion or an air bearing. First and second air guide channels are provided between the pin and the bore of the housing. These air guide channels extend approximately from a position midway between the ends of the pin toward the respective pin ends. A pneumatic inlet port is provided in the housing in such a position that the inlet port communicates with inner ends of the air guide channels, whereby air introduced through the inlet port flows away through the air guide channels. Air flowing through the first air guide channel is conducted out of the housing near the outer end of the pin while air flowing through the second air guide channel is channeled into a pressure space between the inner end of the pin and the closed end of the housing bore to apply pressure to the axially facing pin end surface for moving the pin out of the housing into gentle contact with a work piece.

BRIEF DESCRIPTION OF THE DRAWINGS

In order that the invention may be clearly understood, it will now be described, by way of example, with reference to the accompanying drawings, wherein:

FIG. 1 shows a sectional view through a support element according to the invention whereby the section plane extends in the longitudinal axis of the pin and in the longitudinal axis of a clamping piston;

FIG. 2 shows on a somewhat enlarged scale a detail II from FIG. 4 to illustrate the adjustable throttle device for controlling an air exit;

FIG. 3 is a sectional view along section plane III—III in FIG. 1 and illustrates further details of the clamping piston and its reset spring or springs;

FIG. 4 is a sectional view along line section plane IV—IV in FIG. 1, and illustrates a reset spring for returning the pin into a starting position; and FIG. 5 is a view in the axial direction of the clamping piston from left to right in FIG. 1 and partially in section to illustrate spring biased guide pieces for the clamping piston.

DETAILED DESCRIPTION OF PREFERRED EXAMPLE EMBODIMENTS AND OF THE BEST MODE OF THE INVENTION

FIG. 1 shows a support element SE according to the invention with a housing 9 illustrated in section and a or support pin 1 having an outer work piece contacting end 1A with a contact surface CS for contacting a work piece 16 and an inner end 1B to be exposed to pressurized air. The pin 1 has a cylindrical cross-section preferably having a circular configuration. The pin 1 is received in a housing bore 17 in the housing 9, whereby the outer diameter of the pin 1 is slightly smaller than the inner diameter of the bore 17 to provide a play just sufficient to permit the pin 1 to move within the bore 17 substantially free of friction in a so-called floating state supported by an air cushion as will be described in more detail below. This floating state of the pin 1 prior to its clamping or locking is essential for the operational sequence of the present support element SE.

The pin 1 is pneumatically driven into contact with the work piece 16. For this purpose the housing 9 is provided with an inlet port 4 for a pneumatic pressure medium which flows into two air guide channels 5 and 6. The channel 5 communicates with the inlet port 4 and extends toward the outer end 1A of the pin 1. The air guide channel 6 extends from the inlet port to the inner end 1B of the pin 1 and into a pressure chamber 12. Thus, the position of the pin 1 in the housing 9 is determined by the air flowing through the port 4 into the air guide channels 5 and 6. The play between the inner wall of the bore 17 and the pin 1 is so selected that the air flowing through the channel 5 to the outer end 1A and to the inner end 1B can flow sufficiently freely to maintain the support bolt in a floating condition substantially free of friction corresponding in principle to an air bearing.

The air flowing through the channel 5 serves two purposes. First, the air in channel 5 guides the pin 1 in the bore 17. Second, this air in channel 5 simultaneously keeps the air gap between the pin 1 and the bore 17 clean by removing any cooling medium used, for example, in a machine tool and any other contaminations since the air through the channel 5 flows out of the housing 9 through a throttle 3 adjustable by a manually operable throttle screw 13 as will be described in more detail below with reference to FIG. 2. The air flowing to the inner end 1A through the channel 6 also serves two purposes. First, the air in channel 6 guides the pin 1 and then it provides a sufficient pressure for initially moving the pin 1 with its outer surface CS against the work piece 16 in a gentle manner without disturbing a located position of the work piece 16.

This operation is started in that the air passing through the channel 6 enters into the pressure chamber 12 where it becomes effective on the axially facing inner end surface 2 of the pin 1. This pressure drives the pin 1 out of the housing 9. For this to happen, it is necessary that the air volume supplied through the inlet port 4 is larger than the air volume passing out of the housing 9 through the manually controlled throttle 3. This controlled air quantity difference also determines the motion of the pin 1 including the velocity of the pin 1 as it moves toward the work piece 16. This velocity of the pin 1 must be selected with due regard to the instability or lability of the work piece 16. Thus, according to the invention the throttle 3 is provided with the manual adjustment screw for controlling the air pressure that is applied on the inwardly axially facing end surface 2 of the pin 1.

Referring to FIG. 2, the pin 1 is provided with a central is bore 18 extending coaxially with the central longitudinal axis 14 of the pin 1. Basically, the bore 18 is a dead-end bore which passes from the inner end 1B of the pin 1 toward the outer end, but stops short of the outer end contact surface. The end of the bore 18 is closed except for a throttle opening for the needle of the throttle 3. The needle is for example hollow and extends into the bore 18, thereby forming an air discharge channel. The cross-sectional flow area is manually controllable by the throttle screw 13 having a longitudinal axis 13A extending at an angle A relative to the central longitudinal axis 14 of the pin 1. The angle A is so selected that the position of the throttle 3 will not interfere with the proper contact of the contact surface CS with the work piece 16. More specifically, the angle A will be so selected that the throttle 3 with its screw 13 is laterally displaced away from the central area of the contract surface CS. Operating of the throttling adjustment screw 13, will determine the quantity of the air volume flowing out through the throttle 3, whereby the velocity of the pin 1 out of the housing 9 can be finely controlled.

Referring to FIGS. 1 and 3 in conjunction, the pin 1 is, as mentioned, freely movable in the bore 17 of the housing 9. Thus, once the pin 1 has reached the position in which its outer end surface CS contacts the work piece 16, it is necessary to lock the pin 1 in that position. A hydraulic piston 7 is provided for this purpose. The piston 7 is movable back and forth in a bore 7C in the housing 9. The bore 7C has a bore axis 7D extending perpendicularly to the central longitudinal pin axis 14. When a hydraulic pressure P is applied to the outwardly facing surface of the piston 7, the inwardly facing surface 15 of the piston 7 will bear against the side of the pin. The piston surface 15 forms a saddle that encircles the pin 1 at least partly, preferably for more than 180°. As a result, the pin 1 is pressed against the inner surface 8 of the bore 17 opposite the piston 7. The saddle 15 is preferably formed as a concave prism. The piston 7 is guided inside the bore 7C in the housing 9 by at least one cylinder ring CR. Further, the piston 7 is held in the bore 7C by a spring ring 7B. At least one additional spring 7A is positioned to return the piston 7 into a starting position when the pressure P is released. However, the piston 7 may also be constructed as a double acting piston, whereby the reset or return spring or springs 7A become unnecessary since the double acting piston can be returned into its starting position by a respective application of a hydraulic pressure. As shown, the piston 7 moves to the right against the pin 1 under the pressure P and is returned to the left with the force of the spring or springs 7A.

Referring to FIGS. 3 and 5 in conjunction, the piston 7 is guided in the bore 7C of the housing 9 in such a manner that the piston 7 cannot be influenced by any crosswise extending force components that could be generated by the moving pin 1. For this purpose, the piston 7 is tightly pressed against the surface 11 of the bore 7C in which the piston moves back and forth. In order to enhance the guidance of the piston 7, it is preferred to provide one or two pressure shoes 10 that are biased by springs 10A against the surface of the piston 7 in a slidable manner. Preferably the biasing force of the springs 10A is adjustable by screws 10B. These springs make sure that the surface of the piston 7 is pressed against the surface 11 opposite the shoes 10 in the bore 7C.

Referring to FIG. 4, the pin 1 is reset into a starting position when the initial pin positioning air pressure is released and when simultaneously the hydraulic pressure P on the piston 7 is released. For this purpose, the central axial bore 18 of the pin 1 has a bore section 18A with a diameter larger than the rest of the bore 18. The enlarged diameter bore section 18A holds a reset spring 19, one end of which is secured to the housing 9, preferably by a screw 19A or the like, while the other end 19B of the spring 19 is secured inside the bore section 18A. As soon as the air setting pressure that moves the piston gently against the work piece 16 surface is released, the spring 19 will return the pin 1 into a starting position as shown in FIG. 4, unless the piston 7 bears against the side of the pin 1.

In operation the work piece 16 is first located on a supporting surface. Then air under pressure is introduced into the inlet port 4. The air flows through the air guide channels 5 and 6, thereby assuring a low friction movement of the pin 1 by forming an air cushion around the circumferential surfaces of the pin 1. The air also moves the pin 1 axially into contact between the pin surface CS and the work piece 16, whereby this movement is manually adjusted as described above through the throttle screw 13 so that the contacting will not disturb the located position of the work piece 16. By permitting a certain volume proportion of the pressurized air to escape through the throttle 3 in a controlled manner it is possible to finally control the velocity of the pin 1. As soon as the surface CS has contacted the work piece 16 the hydraulic pressure P for the piston 7 is applied and the piston 7 moves into a position pressing the pin 1 against the surfaces 8 of the bore 17 to thereby lock the pin 1 into a work piece holding position. Once the pin 1 is locked in that position, the air pressure is removed, but the pin 1 remains in the work piece holding position under the hydraulic pressure P applied through the piston 7 because the force of the spring 19 is insufficient to return the pin 1 into the starting position as long as the piston 7 presses the pin 1 against the surfaces 8 in the bore 17. Only after the hydraulic pressure P has been removed from the piston 7 will the spring 19 become effective and return the pin 1 into its starting position.

Although the invention has been described with reference to specific example embodiments, it will be appreciated that it is intended to cover all modifications and equivalents within the scope of the appended claims.

What is claimed is:

1. Support element for first contacting a work piece without displacing said work piece and then supporting said work piece on a mounting surface comprising a housing (9), in said housing a housing bore (17) having an open end and a dead end for forming a pressure chamber (12), a pin (1) supported in said bore (17) for axial movement, said pin (1) having an outer diameter slightly smaller than an inner diameter of said housing bore (17) for moving through said open end out of said bore (17), two air guide channels (5, 6) formed between said pin (1) and said housing bore (17), said air guide channels extending from approximately midway of said housing bore (17) in opposite directions of said pin (1), a pneumatic inlet port (4) in said housing (9) communicating with said two air guide channels (5, 6) for feeding an airflow into said two air guide channels, wherein said airflow is detoured in said air guide channels (5, 6), whereby an air portion passing through one air guide channel (5) exits through said open end of said housing bore (17) and air passing through the other air guide channel (6) enters into said pressure chamber (12) formed between an inner end of said pin (1) and said dead end of said housing bore (17) for exerting a positioning force on said pin (1) to move said pin (1) out of said open end of said housing bore (17) into an extended position for contacting said work piece, and means for locking said pin in an extended position by a locking force.

2. The support element of claim 1, wherein said pin (1) comprise a longitudinal pin bore (18) open at an inner end of said pin and extending toward an outer end of said pin (1), said support element further comprising a throttle (3) arranged near an outer end of said pin (1), said throttle (3) comprising a throttle needle reaching into said pin bore (18) for forming an air exit for air entering said inlet port (4), and wherein said throttle needle is adjustable by a throttling screw (13) for controlling a cross-sectional flow area of said air exit.

3. The support element of claim 2, wherein said pin bore (18) extends coaxially to a central longitudinal axis (14) of said pin (1).

4. The support element of claim 2, wherein said throttle needle is a hollow needle.

5. The support element of claim 2, wherein said throttle (3) with its throttling screw (13) extends at an angle (A) into said pin (1) in such a manner that the throttle and its screw are positioned outside the working surface (CS) of said pin (1).

6. The support element of claim 1, wherein said means for locking said pin in said extended position comprise a hydraulic piston (7) movable in a cylinder bore (7C) of said housing (9) perpendicularly to a longitudinal axis (14) of said pin (1), for pressing said hydraulic piston (7) against said pin (1) by a hydraulic pressure (P), and wherein as a result of pressurizing said hydraulic piston (7), said pin (1) is pressed against an inner wall (8) of said housing bore (17) to thereby lock said pin (1) in said extended position.

7. The support element of claim 6, wherein said hydraulic piston (7) has a piston head comprising a concave recess (15) extending at least partly around said pin (1).

8. The support element of claim 7, wherein said concave recess (15) encircles said pin (1) for more than 180° when said hydraulic piston bears against said pin (1).

9. The support element of claim 6, wherein said hydraulic piston (7) bears against said pin (1) just after said pin (1) has contacted said work piece (16).

10. The support element of claim 6, further comprising at least one spring biased guide shoe for said hydraulic piston (7), said guide shoe pressing said hydraulic piston (7) in a sliding manner against a guide surface (11) of said cylinder bore (7C).

11. The support element of claim 1, further comprising at least one reset spring (19) secured between said housing and said pin (1) for resetting said pin into a starting position when said positioning force and said locking force are removed from said pin (1).

12. The support element of claim 1, wherein said positioning force exerted on said pin is directed in parallel to said axial movement of said pin, and wherein said locking force is directed perpendicularly to a longitudinal axis of said pin.

* * * * *